(12) United States Patent
Podolefsky

(10) Patent No.: US 10,749,224 B2
(45) Date of Patent: Aug. 18, 2020

(54) RECHARGEABLE BATTERY POWER SYSTEM HAVING A BATTERY WITH MULTIPLE USES

(71) Applicant: OSC Manufacturing & Equipment Services, Inc., Buffalo, NY (US)

(72) Inventor: Noah Solomon Podolefsky, Boulder, CO (US)

(73) Assignee: OSC Manufacturing & Equipment Services, Inc., Buffalo, NY (US)

( * ) Notice: Subject to any disclaimer, the term of this patent is extended or adjusted under 35 U.S.C. 154(b) by 1402 days.

(21) Appl. No.: 14/827,965

(22) Filed: Aug. 17, 2015

(65) Prior Publication Data
US 2017/0052585 A1   Feb. 23, 2017

(51) Int. Cl.
*H01M 10/625* (2014.01)
*H01M 2/10* (2006.01)
*H01M 10/42* (2006.01)
*H02P 27/04* (2016.01)
*H02P 27/02* (2016.01)

(52) U.S. Cl.
CPC ....... *H01M 10/625* (2015.04); *H01M 2/1077* (2013.01); *H01M 10/425* (2013.01); *H02P 27/02* (2013.01); *H02P 27/04* (2013.01); *H01M 2/1094* (2013.01); *H01M 2010/4278* (2013.01); *Y02T 10/642* (2013.01); *Y02T 10/7005* (2013.01); *Y02T 10/7077* (2013.01)

(58) Field of Classification Search
None
See application file for complete search history.

(56) References Cited

U.S. PATENT DOCUMENTS

| 5,913,811 | A  | 6/1999  | Kinugawa et al.  |
|-----------|----|---------|------------------|
| 5,991,677 | A  | 11/1999 | Kinugawa et al.  |
| 6,078,855 | A  | 6/2000  | Kinugawa et al.  |
| 6,199,307 | B1 | 3/2001  | Kagoshima et al. |
| 6,491,123 | B1 | 12/2002 | Pasquini et al.  |
| 6,615,946 | B2 | 9/2003  | Pasquini et al.  |
| 6,666,022 | B1 | 12/2003 | Yoshimatsu et al.|
| 6,725,581 | B2 | 4/2004  | Naruse et al.    |

(Continued)

FOREIGN PATENT DOCUMENTS

WO    WO2008/095116    7/2008

*Primary Examiner* — Bickey Dhakal
(74) *Attorney, Agent, or Firm* — Stadler IP Law PLLC

(57) ABSTRACT

Conventional internal combustion engine technology has been around for decades and historically has been the primary power source for virtually all industrial equipment. It relies on carbon-based fuels, is loud, polluting, and the machines it powers are expensive to operate and maintain. A self-contained, rechargeable battery system is provided that possesses improved power than comparable diesel and gas engines and it generates zero emissions, is virtually maintenance free, is quiet, and recharges overnight via a standard electrical outlet. The rechargeable battery power system can be installed in new and used construction equipment and may be used wherever a source of power is required including smart grid application. It can be safely used indoors, in neighborhoods and other locations sensitive to the side effects of internal combustion engines. There is a battery management system that controls sequential shutdown system and a power reserve system to control operation of the battery.

8 Claims, 13 Drawing Sheets

(56) References Cited

U.S. PATENT DOCUMENTS

| | | |
|---|---|---|
| 6,789,335 B1 | 9/2004 | Kinugawa et al. |
| 6,820,356 B2 | 11/2004 | Naruse et al. |
| 6,945,039 B2 | 9/2005 | Yoshino |
| 6,959,241 B2 | 10/2005 | Itow et al. |
| 7,053,568 B2 | 5/2006 | Rudinec |
| 7,511,449 B2 | 3/2009 | Speckhart et al. |
| 7,911,079 B2 | 3/2011 | Hoff |
| 7,950,481 B2 | 5/2011 | Betz et al. |
| 8,100,210 B2 | 1/2012 | Takeuchi et al. |
| 8,125,105 B2 | 2/2012 | Ishida et al. |
| 8,286,741 B2 | 10/2012 | Kawashima |
| 8,950,180 B2 | 2/2015 | Ooki |
| 10,442,481 B2 * | 10/2019 | Podolefsky ............... E02F 9/16 |
| 2005/0237021 A1 | 10/2005 | Sugano et al. |
| 2006/0117192 A1 * | 6/2006 | Nokkonen ............. G06F 1/305 |
| | | 713/300 |
| 2009/0261761 A1 | 10/2009 | Yoshioka |
| 2012/0157253 A1 | 6/2012 | Hoff |
| 2012/0205171 A1 | 8/2012 | Takishita et al. |
| 2012/0207620 A1 * | 8/2012 | Dalum .................... B60K 6/12 |
| | | 417/44.1 |
| 2012/0253570 A1 | 10/2012 | Anders et al. |
| 2012/0253610 A1 | 10/2012 | Andrers et al. |
| 2012/0285757 A1 | 11/2012 | Atarashi et al. |
| 2012/0292918 A1 | 11/2012 | Bichler et al. |
| 2013/0071212 A1 | 3/2013 | Yunoue et al. |
| 2013/0119769 A1 * | 5/2013 | Johnson ................... H02J 3/38 |
| | | 307/68 |
| 2013/0133966 A1 | 5/2013 | Jiang et al. |
| 2013/0141889 A1 | 6/2013 | Tsuchiya et al. |
| 2014/0244051 A1 * | 8/2014 | Rollins ............... B01F 3/04078 |
| | | 700/282 |

* cited by examiner

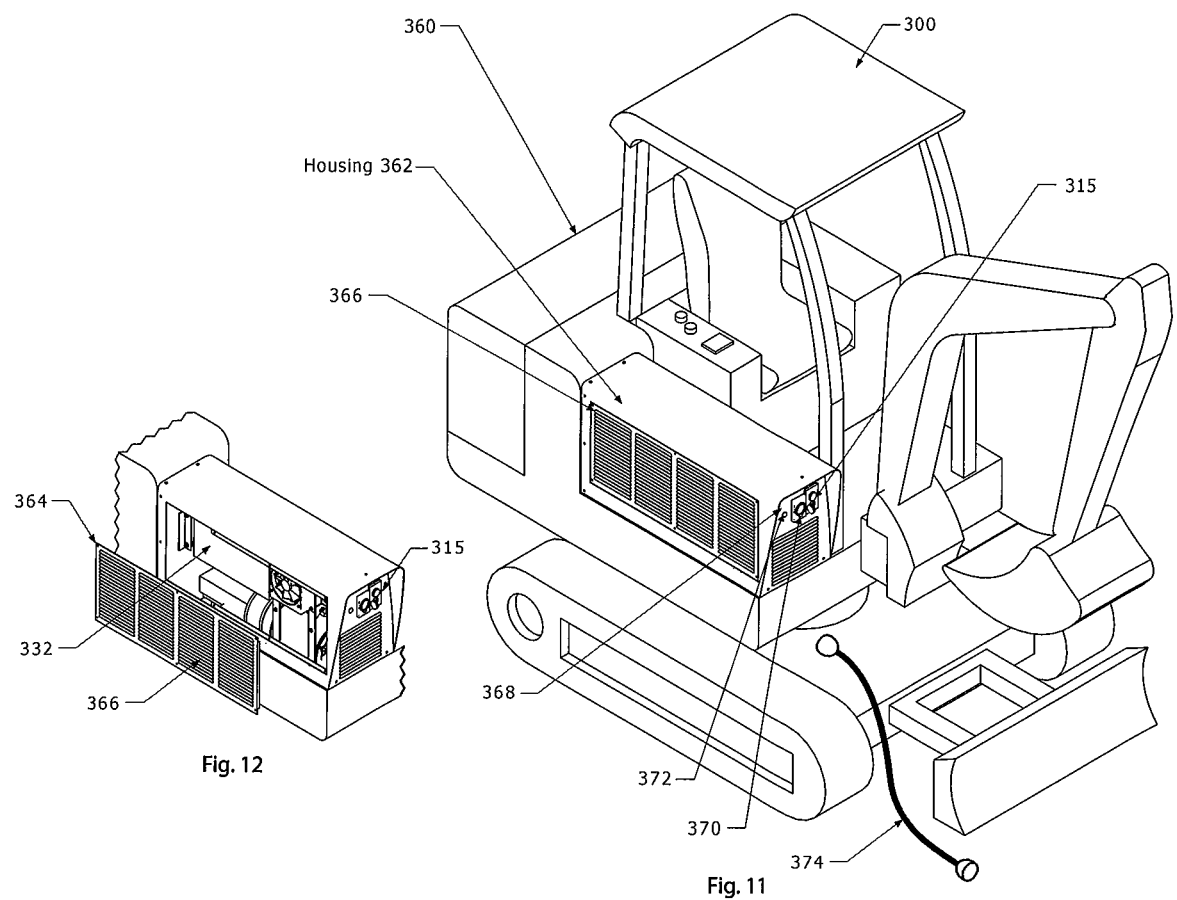

RECHARGEABLE BATTERY POWER SYSTEM HAVING A BATTERY WITH MULTIPLE USES

BACKGROUND

Energy is in constant need for powering equipment of all types and kinds. Recently, there has been a trend to power a plurality of different machines, for example automobiles, motorcycles, and construction equipment with electric. Typically these electrically powered devices will carry a power source in the form of a battery to power them.

However, there are needs for improved battery designs that have a more universal applicability so that the battery is capable of powering devices from light towers to bulldozers.

SUMMARY

There is provided a rechargeable battery power system having a battery with multiple uses. The rechargeable battery power system provides for a clean and quiet power source that includes a self-contained battery that does not require active cooling and that can be used in a plurality of different applications that require electric power.

In particular, there is a battery assembly that comprises a battery housing and a battery, and the battery is disposed in the battery housing. The battery is a multiple use battery because it may be used in a plurality of different applications ranging from a stand-alone power source to a power source for powering equipment, lights and virtually any other machine that has a need for electrical power, for example machines traditionally powered by fossil fuels, such as diesel.

The battery housing has a base wall joined to first and second side walls and the base wall joined to opposed first and second end walls. There is a housing cover that is releasable joined to the first and second opposed side walls and the opposed first and second end walls such that the cover is disposed opposite the base wall.

The first sidewall includes a metal layer and first and second foam layers and a plastic sheet such that the first foam layer abuts against and is joined with the metal layer, and the first foam layer abuts against and is joined with the second foam layer. The second foam layer abuts against and is joined with the plastic sheet.

The second side wall is structurally identical to the first side wall.

The cover has opposed exterior and interior sides and a service disconnect extends from the exterior side. Joined to the interior side of the cover is a plastic sheet, and a foam cover sheet is joined to the plastic sheet such that the plastic sheet is disposed between the interior side of the cover and the foam cover sheet. The first end wall is joined to a first end wall foam sheet and the second end wall is joined to a second end wall foam sheet, and the second end wall has an exterior end wall surface and a current sensor is mounted to the second end wall.

The base wall of the battery housing has a metal base wall sheet having opposed interior and exterior metal base wall surfaces, and joined to the interior metal base wall surface is a base wall plastic sheet that is joined to a base wall rubber sheet.

As previously mentioned, disposed internal to the battery housing is the battery. The battery has first and second module banks Each of the first and second module banks is made of from groups of modules, and each module is made of individual cells. In one preferred embodiment each module has eight (8) cells that are electrically connected to one another, and the modules are electrically connected to one another to form the groups of modules. The first and second module banks may be electrically connected to one another such that together they can output power. In addition, a separator support plate separates the first and second module banks from one another. The separator support plate is part of the battery housing. The separator support plate provides for structural integrity and a thermal barrier between the first and second module banks.

In one of the preferred embodiments, the battery assembly is installed in an excavator or other piece of equipment, for example heavy construction equipment, during the manufacturing process of the excavator or other piece of equipment.

In another preferred embodiment there is provided a method for taking a used piece of equipment, for example a used excavator, and removing its engine. Then, the engine compartment is re-configured to house the battery assembly. There is provided a battery management system, a variable frequency driver and a variable frequency brushless electric motor or other suitable motor the shaft of which is connected to a hydraulic pump in order to complete the conversion from gas/diesel power to electric power.

The rechargeable battery power system also includes a battery sequential shutdown system that allows the battery, for example when installed in a piece of equipment, to be shut down in a in a series of steps. This sequential shutdown prevents damage to the components of the rechargeable battery and drive motor systems.

In addition, the rechargeable battery power system also includes a reserve power reserve system under the control of the battery management system that provides for a reserve of battery power. The battery reserve system will provide power to the piece of equipment, for example an excavator such that it can be driven to a location where the battery can be recharged. This prevents equipment from becoming inoperable and stranded while in the field. In one of the preferred embodiments a person having authority, for example a foreman, is the only one that can access the power reserve system.

The rechargeable battery power system also includes a DC/AC inverter and an AC outlet is mounted on the piece of equipment. This provides workers with access to AC power and can be used to power equipment, for example drills and saws. A key switch is provided on the piece of equipment and it allows a user to turn on the AC power.

In another preferred embodiment there is a light tower comprising a tower frame and the tower frame may be mounted on wheels. The light tower is telescopic and has a base portion that houses an extendable portion wherein the extendable portion can be raised and lowered. A battery assembly is provided and is supported by and connected to the tower frame. Lead lines extend from the battery assembly to a tower inverter that converts DC power from the battery to AC power, and inverter lead lines that extend from the tower inverter to the light array and the light array includes the light bulbs. The light bulbs are light emitting diodes (LEDs) in one of the preferred embodiments. The light tower also has a charger.

The light tower has a housing with a control panel door 446, and the housing supports a charging port so that the battery may be charged. The control panel door allows access to light switches to control the light array, a timer switch, a visual display that displays battery information, for example the percent of charge remaining in the battery and a low battery warning light. The timer switch automatically shuts of the systems after a predetermined amount of time passes to eliminate the possibility of the battery being over-discharged. The timer switch also serves as the main power switch, such that in order to turn the light tower on the user must set the time switch in advance. Also mounted on the light tower housing are convenience outlets that allow a user to run devices in need of electric power. The convenience outlet is powered by the same DC/AC inverter 440 that powers the LEDs. The battery management system will shut down the DC/AC tower inverter to protect the battery in the event a system fault or low battery condition.

In the rechargeable battery system used in all embodiments, such as the excavator and light tower, there are limits set on the battery charge and discharge voltage levels that are narrower as compared to maximum and minimum safe levels, and this provides for an added safety margin against overcharge and discharge, significantly longer battery life.

BRIEF DESCRIPTION OF THE DRAWING FIGURES

FIG. 11 is another perspective view of a hydraulic excavator modified such that it has the rechargeable battery power system.

FIG. 12 is a perspective view of a hydraulic motor of the hydraulic excavator wherein a removable door is show allowing access to the hydraulic motor.

DETAILED DESCRIPTION

Figure 1:
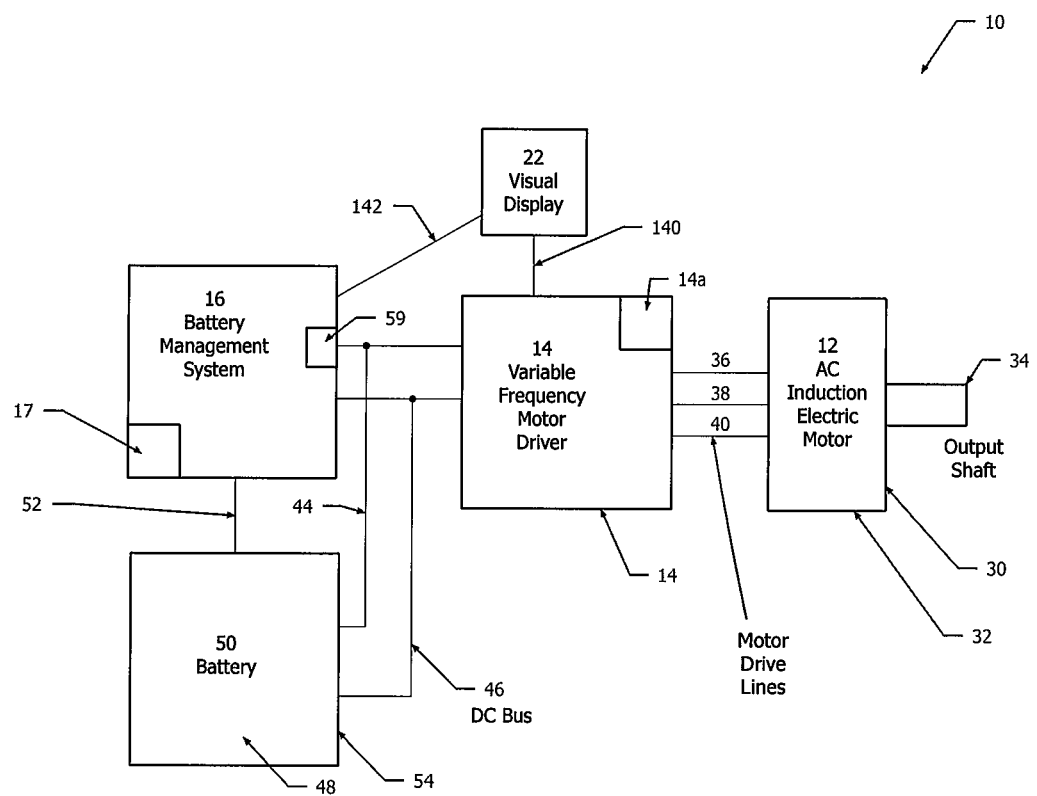
FIG. 1 is a system block diagram of a first embodiment of a rechargeable battery power system.

At the outset, it is to be understood that like reference numerals are intended to identify the same structural elements, portions or surfaces consistently throughout the several drawing figures, such at elements, portions or surfaces that may be further described or explained by the entire written specification, of which this detailed description is a part. Unless otherwise indicated, the drawings are intended to read (that is, cross-hatching, arrangement of parts, proportion, degree, et cetera) together with the specification, and are considered to be a portion of the entire written description. As used in the description, the terms "horizontal," "vertical", 'left, right," "up," "down," as well as adjectival and adverbial derivatives thereof (for example, "horizontally", "rightwardly", "upwardly," et cetera) refer to the orientation of the illustrated structure as the particular drawing figure faces the reader. Similarly, the terms "inwardly" and "outwardly" generally refer the orientation of a surface relative to its axis of elongation, or axis of protestation, as appropriate.

Turning now to FIG. 1, shown therein is a system block diagram of a rechargeable battery power system 10 having a battery assembly 48. The battery assembly 48 includes a battery 50 having multiple uses and includes a battery housing 54 that houses the battery 50. The rechargeable battery power system 10 has an alternating current (hereinafter referred to as AC) electric motor 12 and may be embodied as other types of motors in other preferred embodiments, a variable frequency motor driver 14, a battery management system (sometimes referred to herein as BMS) 16 and the battery 50. The battery 50 is a lithium-ion battery that may be of several types, including but not limited to lithium nickel manganese cobalt oxide (NMC), a lithium cobalt (LCO), a lithium iron phosphate (LFP); a lithium manganese oxide (LMO); and, a lithium nickel cobalt aluminum (NCA). The rechargeable battery power system 10 also includes a visual display 22.

Figure 2:
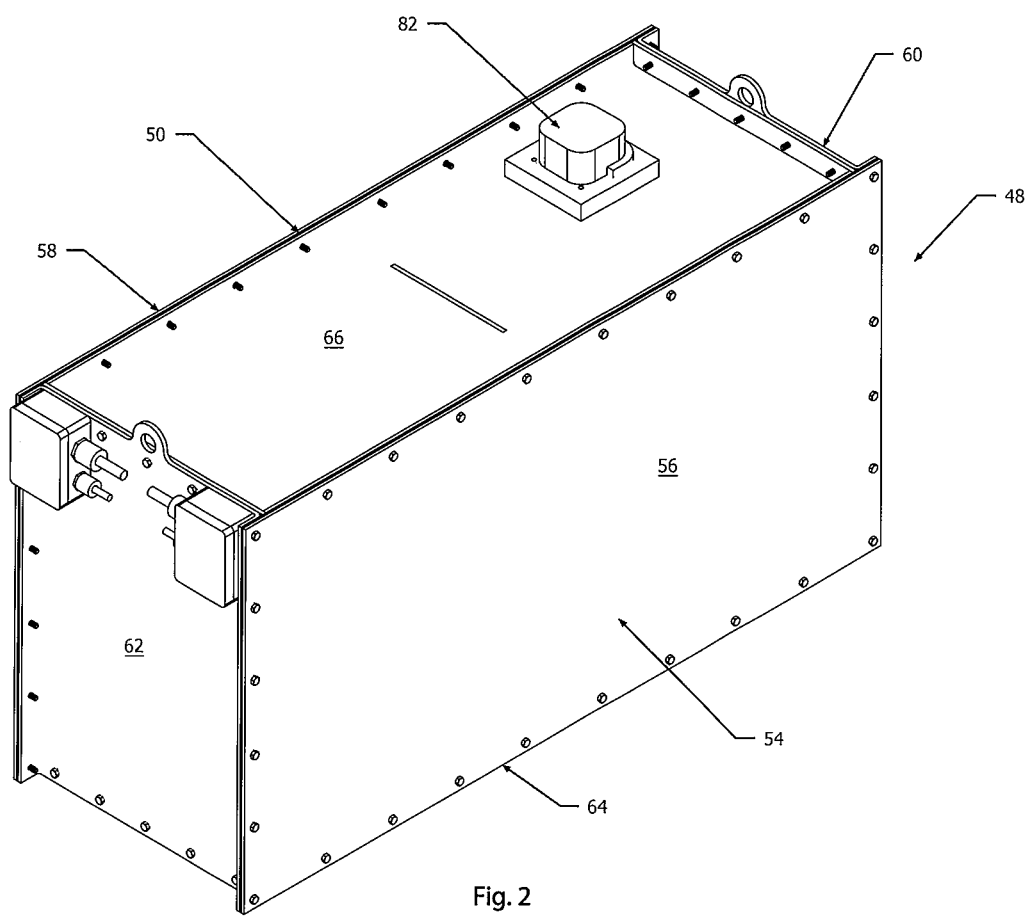
FIG. 2 is a perspective view of an assembled battery assembly for use in the rechargeable battery power system.
Figure 3:
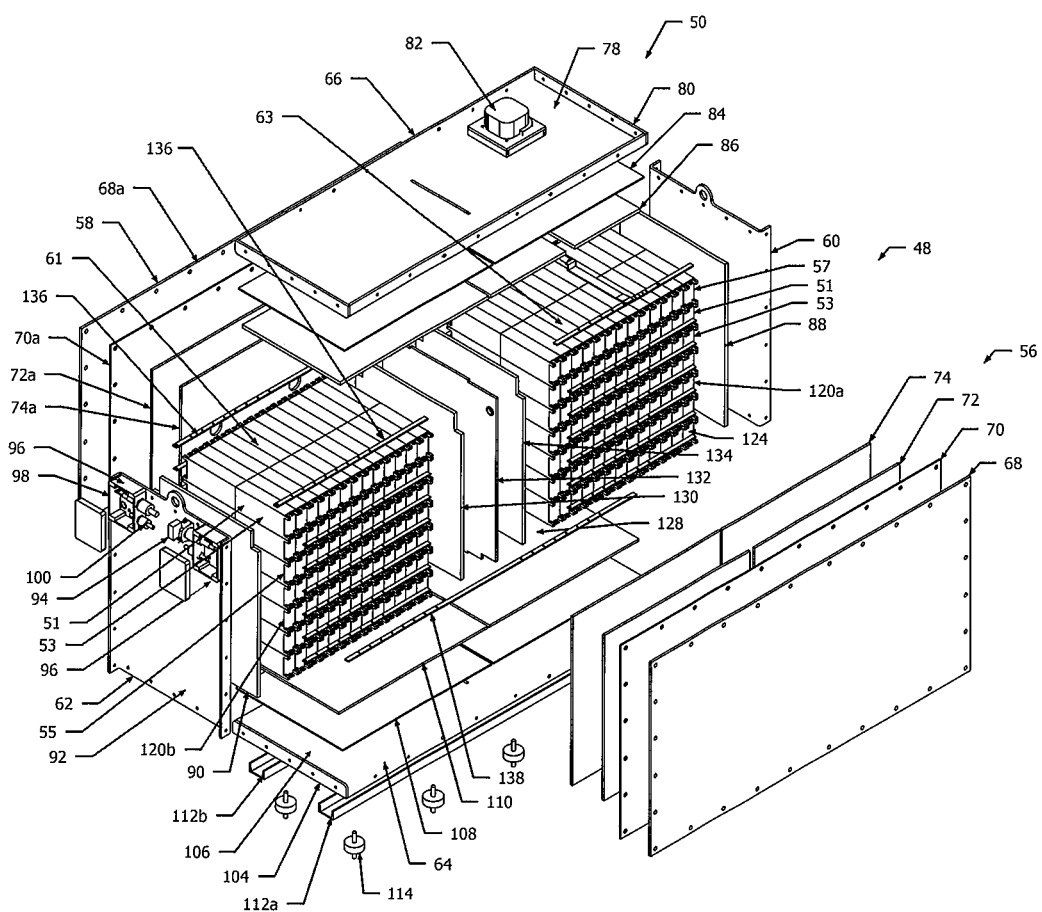
FIG. 3 is an expanded view of the battery assembly shown in FIG. 2.

FIG. 2 is a perspective view of the battery assembly 48, and FIG. 3 shows an exploded view of the battery assembly 48. As shown in FIG. 3 the battery 50 has first and second module banks 61, 63 that are substantially identical. The first module bank 61 is made from a first group of modules 55, and the second module bank 63 is made from a second group of modules 57. In turn, the first and second groups of modules 55, 57 are each made from individual modules commonly designated 53, and each module 53 has individual cells commonly designated 51. The cells 51 are embodied as rechargeable electrochemical cells in one of the preferred embodiments and are for storing electrical energy. In one preferred embodiment each module 53 has eight (8) cells 51 that are electrically connected to one another, and the modules 53 are electrically connected to one another to form the groups of modules 55. In other preferred embodiments each module 53 may have more or less than eight cells 51. The first module bank 61 is electrically connected to a bus bar 136 for allowing current to flow to the terminal boxes 96. And, there are connector bus bars 138 that connect the first and second module banks 61, 63

Figure 4:
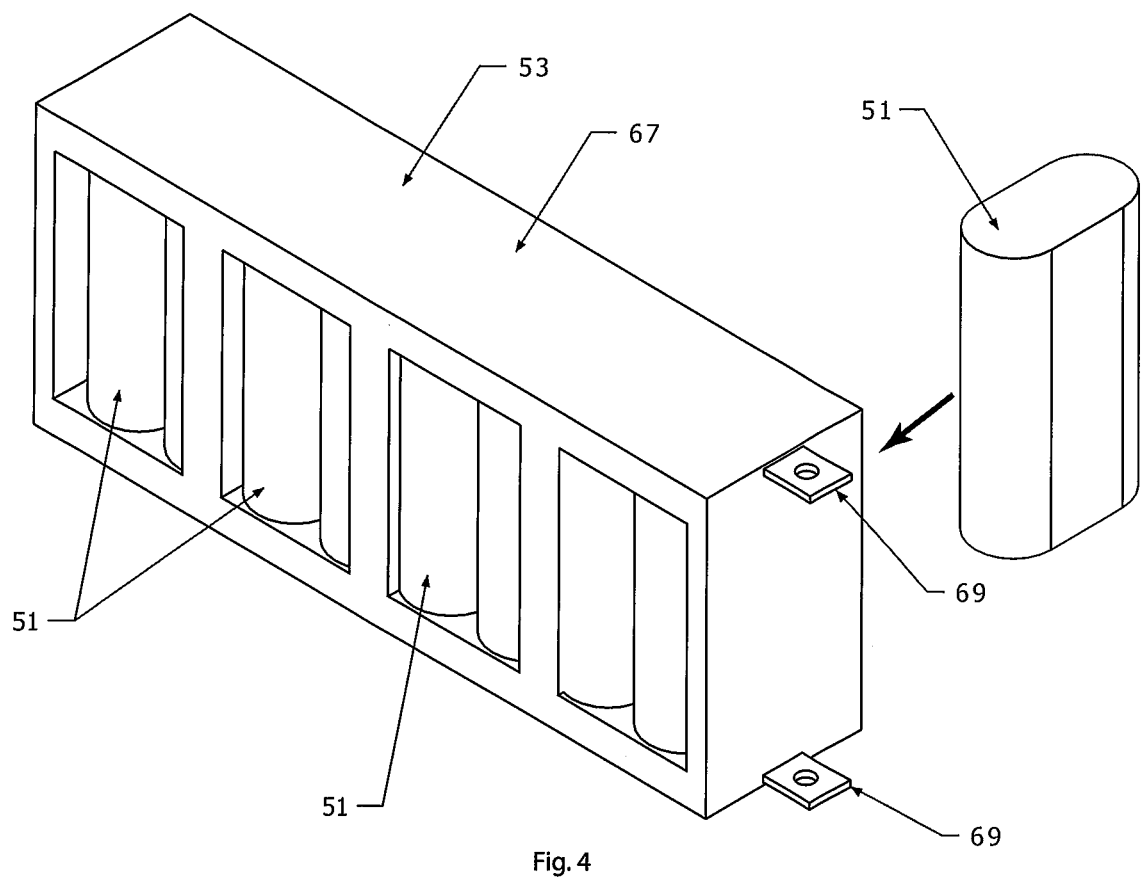
FIG. 4 is a diagrammatic view of a module and cells.

As shown in FIG. 4, the there is a module 53 that has a module case 67 and the cells 51 are stacked together and supported in the module case 67. Module terminals 69 extend from the module case 67 and the module terminals 69 may be electrically connected to other modules 53.

The electric motor 12 shown in FIG. 1 is embodied as a three phase AC induction motor, but in other preferred embodiments other electric motor types may be used. The AC motor has a rotor 30, a stator 32, and an output shaft 34 that delivers output rotary power to a driven object, for example a hydraulic pump. As shown in FIG. 1, the AC induction motor 12 receives first, second and third drive lines 36, 38, 40, one for each phase, and the first, second and third drive lines 36, 38, 40 are driven by the variable frequency motor driver 14. It is pointed out that in other preferred embodiments other electric motors may be used, for example a permanent magnet AC (PMAC) motor may be used. The rotation speed of the AC induction motor 12 ranges from zero to 8,000 (or more) revolutions per minute. In one of the preferred embodiments the AC induction motor 12 is air cooled.

The variable frequency motor driver 14 receives power from first and second direct current (DC) voltage lines 44, 46 from a battery 50, and then it converts electrical power into three phase AC voltage provided on the first, second and third drive lines 36, 38, 40. In addition, the variable frequency motor driver 14 is able to change the frequency and amplitude characteristics of the voltage on each of the first, second and third drive lines 36, 38, 40 so as to be able to control rate of rotation and/or output torque of the AC induction motor 12.

The battery 50 is a lithium-ion type battery The battery 50 is connected to the battery management system 16 on battery lines 52. The battery 50 stores electrical energy provided by the battery management system 16 and provides electrical energy to the variable frequency motor driver 14. The battery management system 16 has a battery management interface 17 for connection to an external power source, such that when the battery management system 16 is connected to an external power source through the battery management interface 17, power is delivered over the battery lines 52 to charge the battery 50.

As shown in FIGS. 2 and 3 and as previously mentioned, the battery housing 54 of the battery assembly 48 includes opposed first and second side walls 56, 58 and opposed first and second end walls 60, 62 and a base wall 64. The first and second opposed side walls 56, 58 and the opposed first and second end walls 60, 62 extend from and are joined to the base wall 64. The battery housing 54 also has a housing cover 66 that is joined to the first and second opposed side walls 56, 58 and the opposed first and second end walls 60, 62 such that it is opposite the base wall 64. The cover 66, the first and second opposed side walls 56, 58, the opposed first and second end walls 60, 62 and base wall 64 may be connected by any suitable method, for example with nuts and bolts, screws, welds, and the like.

As shown in FIG. 3, the first sidewall 56 is layered and includes a metal layer 68 and first and second foam layers 70, 72, and a plastic sheet 74. The plastic sheet 74 in other preferred embodiments is a polycarbonate resin sheet, or a thermoplastic sheet. The polycarbonate resin sheet can be a sheet of LEXAN®. LEXAN® is a registered trademark of Sabic Innovative Plastics IP B.V. having a business address of Plasticslaan 1, 4612 PX, Bergen OP Zoom, Netherlands and LEXAN® is commercially available and well known to those having ordinary skill in the art. The first foam layer 70 abuts against and is joined with the metal layer 68, and the first foam layer 70 abuts against and is joined with the second foam layer 72. The second foam layer 72 also abuts against and is joined with the plastic sheet 74.

The second side wall 58 is structurally identical to the first side wall 56 and includes a metal layer 68a, first and second foam layers 70a, 72a, and a plastic sheet 74a. The first foam layer 70a abuts against and is joined with the metal layer 68a, and the first foam layer 70a abuts against and is joined with the second foam layer 72a, and the second foam layer 72a abuts against and is joined with the plastic sheet 74a. The metal layer 68, the first foam layer 68, the second foam layer 72 and the plastic sheet 74 are joined with an adhesive.

The cover 66 of the battery housing 54 has opposed exterior and interior sides 78, 80 and a service disconnect 82 is joined to and extends from the exterior side 78. The service disconnect incapacitates the battery 50, preventing the possibility of electric shock to a service technician, or damage to the battery during service or repair. Joined to the interior side 80 is a plastic sheet 84 and a foam cover sheet 86 is joined to the plastic sheet 84, such that the plastic sheet 84 is disposed between the interior side 80 and the foam cover sheet 86. In other preferred embodiments the plastic sheet 84 is embodied as a polycarbonate resin sheet, a thermoplastic sheet or sheet of LEXAN®.

The first end wall 60 is joined to a first end wall foam sheet 88, and the second end wall 62 is joined to a second end wall foam sheet 90. The second end wall 62 has an exterior end wall surface 92 and a current sensor 94 is mounted to the second end wall 62 and abuts the exterior end wall surface 92. In addition, terminal boxes 96 are mounted to the second end wall 62 and abut the exterior end wall surface 92. Terminals 98 and a monitor wiring inlet 100 are mounted to the second end wall 62.

The base wall 64 has a metal base wall sheet 102 having opposed interior and exterior metal base wall surfaces 104, 106. Joined to the interior metal base wall surface 104 is a first base wall plastic sheet 108 that is joined to a second base wall rubber sheet 110. In other preferred embodiments the plastic sheet 108 is embodied as a polycarbonate resin sheet, a thermoplastic sheet or sheet of LEXAN®.

The battery housing 54 of the battery assembly 48 is mounted on a pair of brace members 112a, 112b that have channel-shaped cross sections. In particular, isolation mounts 114 are threaded to the base wall 64 and the brace channel 112a, 112b such that they isolate the battery housing 54 from a surface that supports the brace channels 112a, 112b.

As previously described, the battery 50 has first and second module banks 61, 63 that are substantially identical and that are disposed internal to the battery housing 54. As shown in FIG. 3 a gap 128 extends from the first module bank 61 to the second module bank 63 and disposed in the gap 128 are first and second separator foam sheets 130, 134. Disposed between the first and second separator foam sheets 130, 134 is a separator support plate 132. The separator support plate 132 is made of metal in one of the preferred embodiments so that the battery housing 54 is strong and durable and capable of withstanding various external loads imposed thereon, and the separator support plate serves as a thermal barrier between first and second module banks 61.63.

It is pointed out that the battery 50 does not need an active cooling system to be cooled because of its configuration and will not overheat when used in connection with the applications and embodiments to be described presently. Thus, the battery 50 can be completely sealed from the environment, protecting against intrusion of water or other contaminants common in harsh environments. In addition, the battery 50 has a high energy density and thus can provide a long run time on a single charge and can be used in construction applications.

As shown in FIG. 1, the visual display 22 is connected to the variable frequency motor driver 14 by a first visual display line 140, and the battery management system 16 is connected to the visual display 22 by a second visual display line 142. The visual display 22 receives inputs (battery data 59 and variable frequency motor driver data 14a) by way of the first and second visual display lines 140, 142, and displays the battery data 51 and variable frequency motor driver data 14a that pertains to the operation of the variable frequency motor driver 14 and the battery 50.

Use of the rechargeable battery power system 10 having a battery 50 with multiple uses begins with connecting the rechargeable battery power system 10 to the battery 50 by way of the interface 17, the battery management system 16 detects the connection made to the interface 17 and controls the flow of power through the interface 17 to charge the battery 50. Power continues to flow from the external electrical power source through the interface 17 and to the battery 50 until the battery 50 is fully charged. It is pointed out that the interface 17 may be disconnected from the external electrical power source prior completely charging the battery 50. The external electrical power is most commonly the power grid, but may be a generator, for example a portable diesel powered generator.

The AC induction motor 12 is typically mounted on a surface or on a vehicle frame. The output shaft 34 is coupled to a drive object or driven shaft prior to actuating the AC induction motor 12. When the AC induction motor 12 is actuated the variable frequency motor driver 14 causes electrical power to flow from the battery 50 to the AC induction motor 12. In particular, the variable frequency motor driver 14 causes a sinusoidal voltage to flow in each of the first, second and third drive lines 36, 38, 40. The variable frequency motor driver 14 controls the frequency and amplitude of the voltage in the first, second and third drive lines 36, 38, 40 in order to control the speed and power output of the AC induction motor 12. The visual display 22 provides an active display of operating information from the variable frequency motor driver 14. Then, when the charge in the battery 50 is depleted, the interface 17 is reconnected to the electrical power source in order to recharge the battery 50 as described.

It is pointed out that the battery 50 is adaptable for use in virtually any application requiring electrical power including vehicles, machines, homes, businesses and the like. In other words, the applications wherein the battery 50 may by employed and used is without limit.

Figure 10:
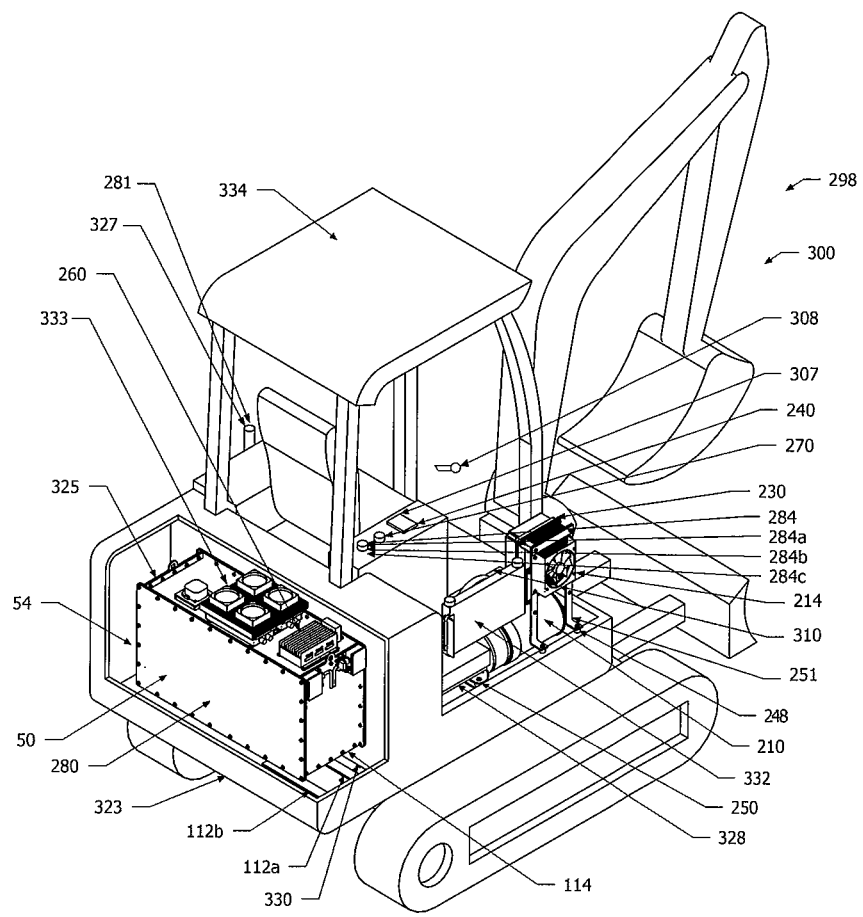
FIG. 10 is a perspective view of a hydraulic excavator modified such that it has a rechargeable battery power system.

FIGS. 5-8 show a second embodiment wherein there is a machine rechargeable battery power system 200 provided for use in a piece of equipment 298 that requires a source of power, for example an excavator 300 shown in FIGS. 10-12.

Figure 5:
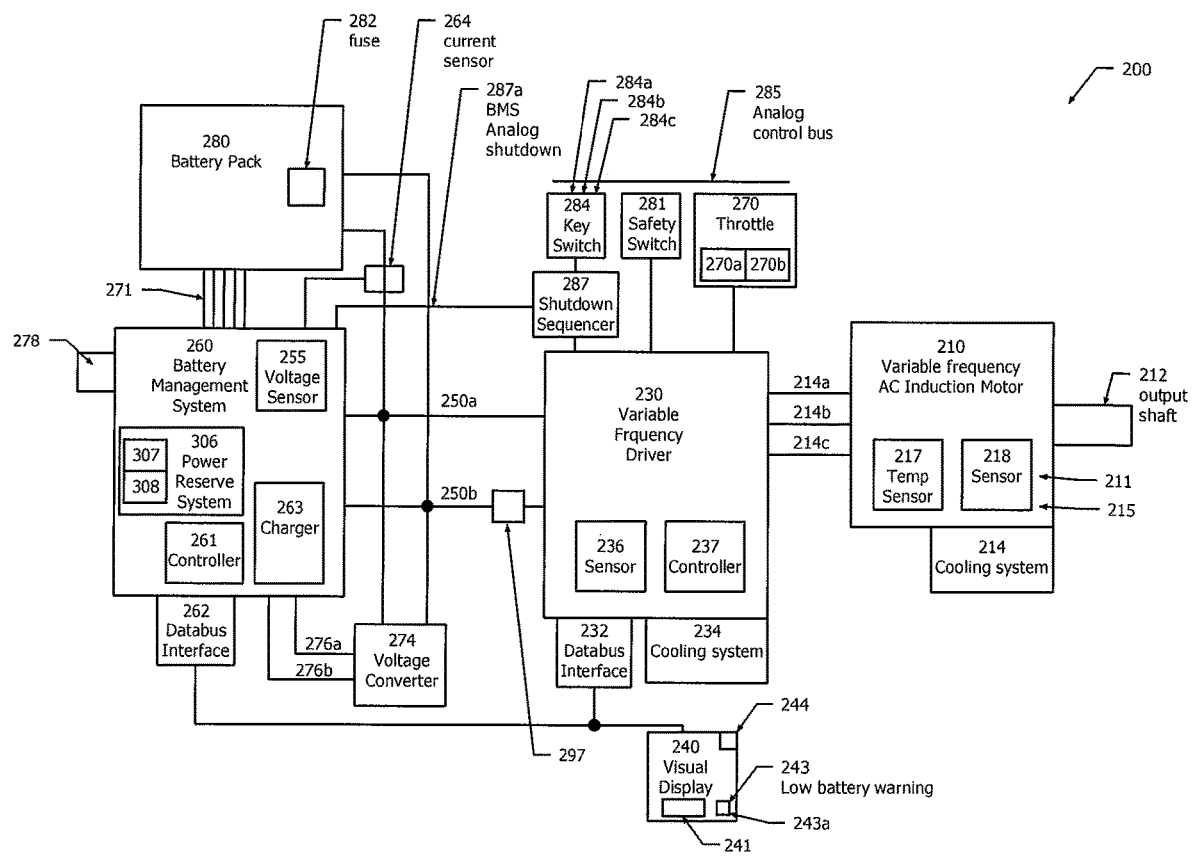
FIG. 5 is a system block diagram of another embodiment of a rechargeable battery power system for use with a piece of equipment, for example a hydraulic excavator.

Turning now to FIG. 5, the machine rechargeable battery power system 200 has the main components that include a variable frequency AC induction motor 210, a variable frequency motor driver 230 and a battery management system 260. There is also a battery 280 that is structurally identical to the previously described battery assembly 48 having a battery 50, and the battery 280 may be otherwise embodied, for example the battery 280 can be made more powerful by the addition of identical third and fourth banks of module banks Battery lines 271 extend from the battery 280. The machine rechargeable battery power system 200 further includes a screen 240, a throttle 270, and a voltage converter 274. Outputs 241 generated by the battery management system 260 are displayed on a screen 240. The outputs 241 displayed on the screen 240 include battery charge data. For example, the percentage of the charge remaining in the battery 280 is displayed, or the remaining battery life is displayed as a percentage. A low battery warning 243 that may be, for example, a low battery warning light 243a or flashing light is displayed on the screen 240 when the battery 280 has been discharged and reaches a predetermined level of discharge, for example when the battery 280 is 90% discharged. The operator (not shown) can take action to recharge the battery 280. For example, the operator can drive the piece of equipment 298 (or excavator 300) to a location where it may be recharged. In addition, in one of the preferred embodiments there are multiple levels of low battery warnings 243. For example, when a predetermined level of charge is remaining in the battery 280 a low battery light turns on and is displayed on the screen 240. Then, when even a lower predetermined amount of charge is remaining a pulsing buzzer 244 is activated and emits sounds and the low battery warning light 243a remains on.

The pulsing buzzer 244 and the low battery warning light 243a remain on until the battery 280 is fully depleted, causing all power to the variable frequency AC induction motor 210 and a hydraulic pump 301 (to be described presently) to be cut.

The variable frequency AC induction motor 210 is a three phase AC induction motor, and in other preferred embodiments an electric motor of other types may be used. The variable frequency AC induction motor 210 has a rotor 211, a stator 215, and an output shaft 212 that delivers output rotary power to a driven object. Variable frequency AC induction motors are commercially available and are well known to those having ordinary skill in the art and are therefore not described herein in greater detail. The variable frequency AC induction motor 210 receives three drivelines 214a, 214b and 214c, one for each phase. The variable frequency AC induction motor driver 230 drives the drivelines 214a, 214b and 214c. The variable frequency AC induction motor 210 also contains a temperature sensor 217 that measures the temperature of the variable frequency AC induction motor 210, and a sensor 218 that measures the speed of the rotor 211. The variable frequency AC induction motor 210 also includes a cooling system 214 that is an air cooled system in one embodiment and may be a liquid cooling system in other preferred embodiments. Cooling a motor with air or liquid is well known to those having ordinary skill in the art and is therefore not described in greater detail herein.

The variable frequency motor driver 230 receives power from the first and second DC voltage lines 250a, 250b and converts electrical power into three phase AC voltage provided on the drive lines 214a, 214b and 214c. Variable frequency motor drivers are commercially available, and are well known to those having ordinary skill in the art and therefore they are not described in greater detail herein. The variable frequency motor driver 230 is able to change the frequency and amplitude characteristics of the voltage on each of the drive lines 214a, 214b and 214c so as to control the rotation rate and/or output torque of the variable frequency AC induction motor 210. A databus interface 232 is a controlled area network (CAN) Bus interface, however, other bus interfaces may be used as well. The databus interface 232 receives and transmits information, commands, status, faults, and other similar information utilized by the machine rechargeable battery system 200. The variable frequency motor driver 230 also has analog controls from the battery management system 260. The power received by the variable frequency motor driver 230 from DC voltage bus lines 250a, 250b is provided by the battery 280. The variable frequency motor driver 230 contains the databus interface 232. The databus interface 232 allows the variable frequency motor driver 230 to transmit and receive operating information, commands, statuses, and faults within and used by the machine rechargeable battery system 200. The variable frequency motor driver 230 also has a driver cooling system 234 that is air cooled in a preferred embodiment, and other preferred embodiments the driver cooling system 234 is a liquid cooling system. The variable frequency motor driver 230 also has a driver temperature sensor 236 for measuring the temperature of the variable frequency motor driver 230. The variable frequency motor driver 230 also has a driver controller 237 that in one of the preferred embodiments is a logic based controller such as a microcontroller/microprocessor/CPU/FPGA/CPLD, that may be programmed to cause the variable frequency motor driver 230 to properly control the voltage and/or power on the drive lines 214a, 214b and 214c

The throttle 270 is connected to the variable frequency motor driver 230 and provides variable frequency motor driver 230 information pertaining to a user's desired operating parameters. In particular, the throttle 270 consists of a voltage varying device 270a coupled to a manual controller 270b, thus providing the variable frequency motor driver 230 with a voltage level that represents the desired speed or torque provided by the variable frequency AC induction motor 210. The throttle 270 may be a variable resistor or may also be a Hall effect sensor, or other device capable of controlling a voltage level to the variable frequency motor driver 230. In particular, the Hall effect sensor is sealed and contains no contacts, and the use thereof as the voltage varying device 270a eliminates problems arising from dust, water, and long term use. The throttle 270 is embodied as a knob 270b that controls the voltage varying device 270a. In addition, the knob 270b is easy to implement and is easier to use for the operator compared to a lever actuated throttle. The variable frequency motor driver 230 is coupled or otherwise joined to both the battery 280 through the first and second DC voltage lines 250a, 250b. A safety switch 281 is connected to the variable frequency motor driver 230. In one of the preferred embodiments the safety switch 281 is disposed in the safety bar 327 (shown in FIG. 10) that the operator moves upon exiting the piece of equipment 298. Upon movement of the safety bar 327 power to the variable frequency AC induction motor 210 is cut off. This results in safety and energy savings as the AC induction motor 210 cannot be inadvertently be left on, thus eliminating the possibility of draining the battery 280, for example overnight or during a weekend.

Figure 6:
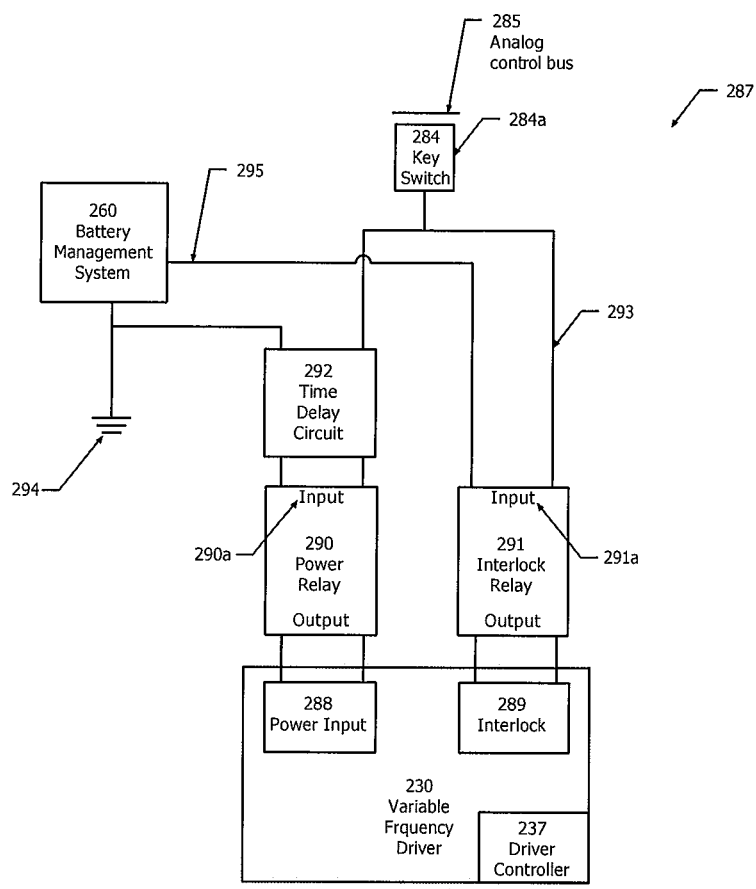
FIG. 6 is a schematic of a shutdown sequencer.

As shown in FIGS. 5, 6 and 10, a key switch 284 is provided. The throttle 270, the safety switch 281 and the key switch 284 are located on an analog control bus 285. The key switch 284 can be rotated to one of three positions, an "Off" position 284a, a "Run" position 284b, and an AC position 284c. When in the "Off" position 284a no electricity is delivered to either the variable frequency AC induction motor 210 or the hydraulic pump 328. When in "Run" position 284b electric power is delivered to the variable frequency AC induction motor 210 and the hydraulic pump 328 (shown in FIG. 10). When in the AC position 284c electric power is made available to an outlet 312 disposed on the excavator 300 (see FIG. 11).

As shown, a current sensor 264 on the first voltage line 250a and the current sensor 264 measures the flow of current in and out of the battery 280. A fuse 286 is located within the battery 280 and is capable of stopping electric current flow in the event the current flow is too high.

As described above, the battery 280 may be embodied to be identical to the previously described battery 50 and has modules 53 of having cells 51 that are embodied as lithium-ion batteries. The cells 51 may be arranged in a 28 serial by 13 parallel array in one of the referred embodiments. Other lithium iron type batteries are also suitable for use. The cells 51 in the battery 280 and the battery 50 are commercially available. Additionally, lithium-ion batteries are well known to those having ordinary skill in the art and therefore are not described in greater detail herein. It is pointed out that the battery 280 and battery 50 may have cells from a different battery provider and may have a different cell arrangement in order to provide different voltage, capacity, maximum current, or battery housing envelope characteristics. Battery 280 is connected to the battery management system 260 via battery lines 271. The battery 280 stores electrical energy provided by the battery management system 260 and provides electrical energy to the variable frequency motor driver 230.

The battery management system 260 may be used in connection with any embodiment mentioned herein. Battery management systems are commercially available and are well known to those having ordinary skill in the art and therefore not described in greater detail herein. The battery management system 260 has a battery management interface 278 for connection to an external electrical power source, for example the power grid or a generator. When the battery management system 260 is connected to the external power source through the battery management interface 278, power is delivered over battery lines 271 in order to charge the battery 280. The battery management system 260 also contains a management system controller 261 for providing logic control for charging and monitoring the battery 280 and communicating with other system components over a management system data bus interface 262. The battery management system 260 also contains a charger 263 that converts voltages and provides current to the battery 280 while recharging. The battery management system 260 controls current provided by the charger 263 and further includes voltage sensors 255, current sensor 264 and thermistors for controlling the charging process of the battery pack 280.

The voltage converter 274 is coupled to the battery management system 260 through first and second converter lines 276a, 276b and is also connected to first and second voltage lines 250a, 250b that are DC. The voltage converter 274 provides efficient voltage conversion from one voltage to another. In particular, the voltage converter 274 is capable of stepping down the voltage of the battery pack 280 to twelve volts (hereinafter referred to as 12V) that is needed by logic management components in the battery management system 260 and other 12V components of the machine electric motor system 200. The voltage converter output may range from 12V to about 13.5V.

Battery Sequential Shutdown System

As shown in FIGS. 5, 6 and 10, the machine rechargeable battery power system 200 also includes a sequential shutdown system 287 so that when the key switch 284 is moved into the "Off" position 284a the sequential shutdown a sequential shutdown system 287 controls the shutdown process for the piece of equipment 298, for example the excavator 300. There is an analog battery management shutdown line 287a that extends from the sequential shutdown system 287 to the battery management system 260. In particular, when the key switch 284 is moved to the "Off" position 284a the sequential shutdown system 287 commands the driver controller 237 of the variable frequency motor driver 230 to stop powering the variable frequency AC induction motor 210, then commands the driver controller 237 to shut down after a time delay. The purpose is to assure that there is no current flowing through the battery lines 271 and main contactor 297 the contactor opens. Opening the contactor with current flowing can cause damage to the contactor and/or the driver controller 237. As shown in FIG. 6, the variable frequency motor driver 230 includes two inputs, a power input 288 and an interlock 289. The power input 288 provides a signal commanding the driver controller 237 to turn on. The interlock input 289 provides a signal commanding the driver controller 237 to allow current to flow to the variable frequency AC induction motor 210. If the interlock input 289 is turned off, current will stop flowing to the variable frequency AC induction motor 210, but the driver controller 237 will stay on, and this will keep the main contactor closed. Disconnecting the power input 288 will shut down the driver controller 237, causing the main contactor to open immediately.

The sequential shutdown system 287 includes a power relay 290 and an interlock relay 291 and a time delay circuit 292. Inputs 290a, 291a to both the power and interlock relays 290, 291, respectively, are powered when the key switch 284 is turned to "Run" position 284b, providing 12V DC power to the power and interlock relays 290, 291 via the key power line 293. The battery management system 260 controls the interlock relay 291 via the relay control line 295 that extends from the battery management system 260. When the software of the battery management system 260 allows the battery 280 to discharge, the relay control line 295 of the battery management system 260 is connected to a 12V ground 294, allowing the interlock relay input 291a to be powered via the key power lines 293. This allows the software of the battery management system 260 to command the driver controller 237 to cut power to the AC induction motor 210 if there is a battery fault or the battery state of charge reaches zero.

The time delay circuit 292 maintains power to the power relay input 290a and the power relay 290 for about one (1) second after the key switch 284 is turned to the "Off" position 284a. The time delay circuit 292 may comprise any circuit that stores energy to power the power relay 290, such as a resistor-capacitor circuit or an integrated circuit timer (not shown). Timer circuits and time delay circuits are well known to those having ordinary skill in the art and therefore are not described in greater detail herein. If the key switch 284 is turned to the "Off" position 284a, the interlock relay 291 opens immediately, removing power from the interlock input 291a and stopping current flow to the AC induction motor 210. The power relay 290 opens about one (1) second later, shutting down the motor driver controller 237 and opening the main contactor. This greatly reduces the possibility of the contactor 297 and other components of the machine and rechargeable battery power system 200 being damaged during shutdown.

Battery Reserve Feature

In normal use, the battery management system 260 commands the driver controller 237 to cut power to the AC induction motor 210 when the battery state-of-charge (hereinafter referred to as SOC) and designated by reference number 296 in FIG. 7, the total voltage of the battery 280, or a cell 51 within the battery 280 reach a set or predetermined lower limit. This would result in other machines currently in use becoming inoperable and stranded, and thus unable to drive back onto a trailer or to a charging location.

In order to resolve the problem of the excavator 300 or other piece of equipment becoming stranded or shutting down at an undesirable time or location, the there is a power reserve system 306 under the control of the battery management system 260 that provides for a reserve of battery power. The power reserve system 306 allows the piece of equipment 298 to operate for a short time after the BMS 260 normally commands the driver controller 237 to cut power to the AC induction motor 210. The power reserve system 306 is activated with a reserve switch 307 accessible by use of a reserve key 308. The use of a reserve key 308 is used so that machine operators (not shown) do not normally have access to the power reserve system 306. In other preferred embodiments the power reserve system 306 could be controlled remotely, for example with a wireless device connected to the Internet.

In order for the a power reserve system 306 to operate, battery 280 has to have some usable energy remaining after the battery management system 260 first commands the driver controller 237 to cut power to the AC induction motor 210. As shown in FIG. 7, this is accomplished by setting the normal SOC 296 lower limit at some percentage above zero, and individual cell 51 voltage lower limits above the lowest voltage that will not damage the cells 51. The total battery 230 voltage lower limit may also be set higher than the lowest allowable battery 230 voltage (defined as the lowest cell voltage multiplied by the number of cells 51 in series).

Figure 7:
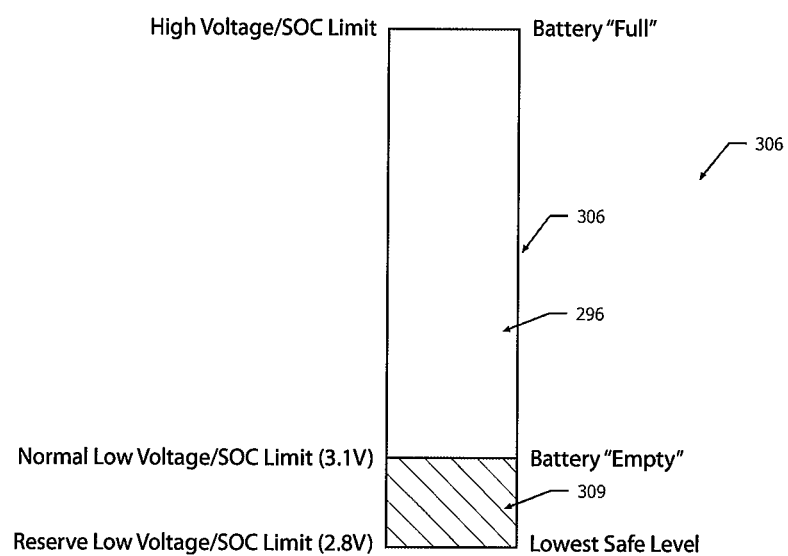
FIG. 7 shows a battery capacity indicator wherein the battery capacity includes a battery reserve capacity.

As shown in FIG. 7, the high voltage and SOC 296 upper limit exists when the battery 280 is fully charged. As shown, if the lowest allowable voltage is 2.8V of the cell 51, the normal lower limit voltage may be set to 3.1V and the battery is empty as far as the operator of the excavator is concerned. When the power reserve system 306 is activated, the battery management system 260 allows the piece of equipment 288 to continue discharging the battery 280 until it reaches a new cell voltage lower limit, for example 2.8V. These voltage limits are set such that the battery reserve 309 indicated in FIG. 7 provides enough run time to return the piece of equipment 298 to a trailer or charging location. The battery management system 260 will then again commands the driver controller 237 to cut power to the AC induction motor 210 the when a cell 51, battery 230, and/or SOC 296 have reached the new lower limits set by the power reserve system 306.

The battery display 240 will read zero or "empty" when the normal SOC 296 or voltage limits are reached. When the power reserve system 206 activates the battery reserve function the display 240 will continue to read zero. When the battery 280 is charged the battery display 240 will reset to normal operation.

It is pointed out that in order for the reserve function of the power reserve system 306 to operate as described above, the battery management system 260 must commands the driver controller 237 to cut power to the AC induction motor 210 before the battery 280 has reached the absolute safe lower voltage limit. This reduces the normal usable capacity of the battery 280. However, raising the lower voltage limit of the cell 51 has other advantages, namely it increases the cycle life of the cells 51 and also serves as a safety buffer such that damage to the battery 280 is less likely should there be a malfunction in any protection systems. Thus, using lower limits to SOC 296 and voltage that are higher than the lowest safe limits have a plurality of advantages which work in unison, but are weighed against a loss in usable capacity.

Inverter for AC Power

Figure 8:
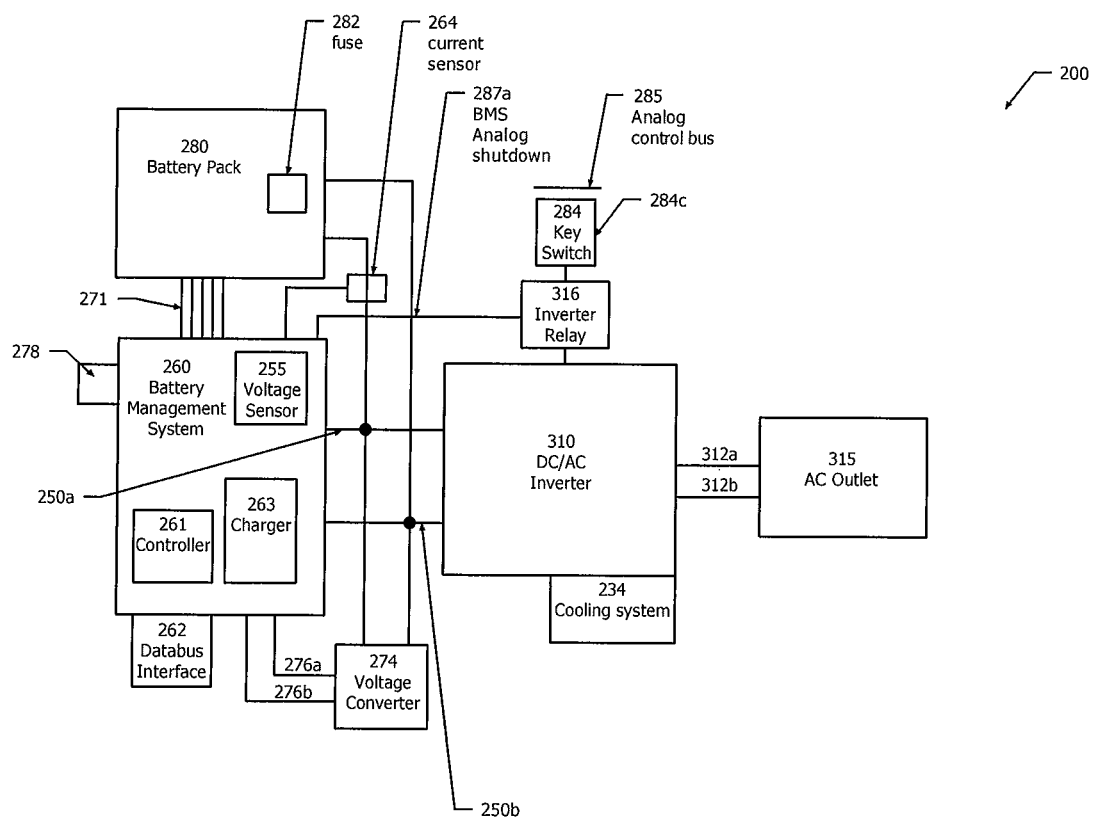
FIG. 8 is a system block diagram that includes an inverter for use of the rechargeable battery power system of FIG. 5.

As shown in FIGS. 8 and 10 the machine rechargeable battery system 200 also includes a DC/AC inverter 310 that makes use of a cooling system 314. Lead lines 312a, 312b extend from the DC/AC inverter 310 to an AC outlet 315 disposed on, for example the excavator 300 as shown in FIGS. 11 and 12. The key switch 284 is turned to the AC position 284c in for power to be supplied to the AC outlet 315. An inverter relay 316 is provided and is in communication with the key switch 284, the DC/AC inverter 310 and the battery management system 260. The battery management system 260 uses the inverter relay 316 to cut power to the DC/AC inverter 310 when the battery reaches a low voltage or SOC 296. Thus, the piece of equipment 298 also provides a source of AC power for example to power drills and saws.

Rebuild of Used Machines

Figure 9:
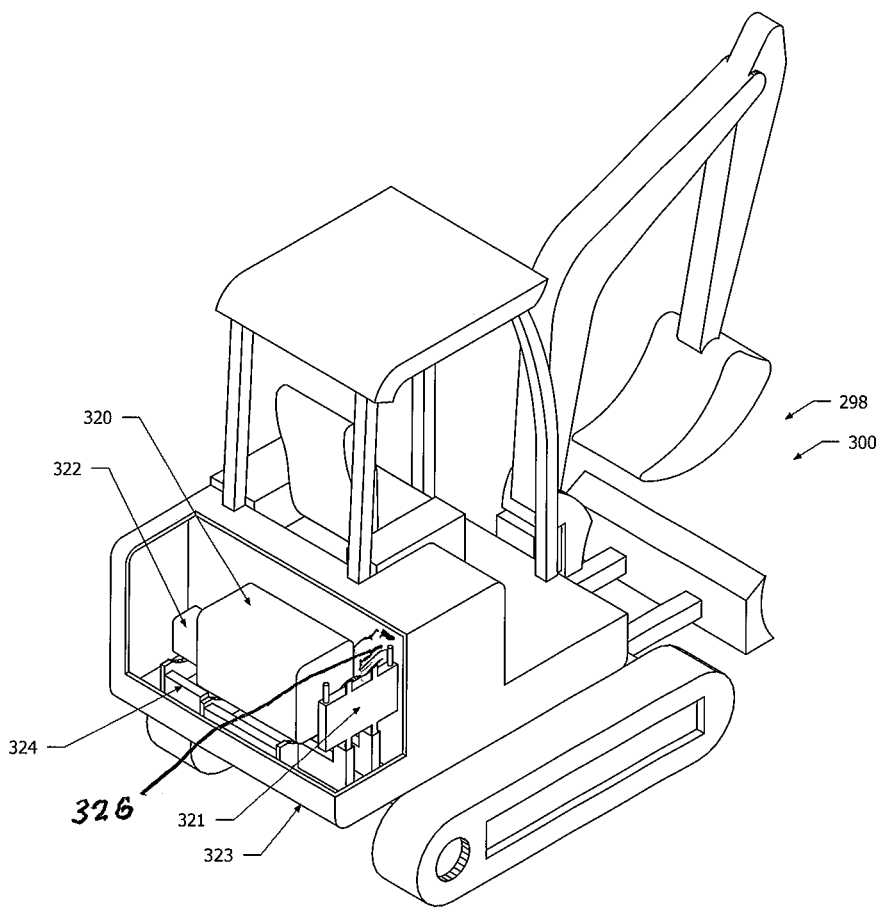
FIG. 9 shows a hydraulic excavator powered by an internal combustion engine such as a gas or diesel engine.

FIG. 9 shows another preferred embodiment the piece of equipment 298 is embodied as an excavator that has been used and powered by an internal combustion engine 320, for example a gas or diesel engine, and having an engine cooling system 321, and a hydraulic pump 322. There is also a frame 323 that supports the engine 320 on frame support bars 324 that are supported by the frame 323. Mounting engines on frames is well known to those who have ordinary skill in the art and therefore not described in greater detail herein.

As shown in FIGS. 10-12, the excavator 300 is modified to include the machine above-described rechargeable battery power system 200 including the sequential shutdown system 287, power reserve system 306, the inverter 310 and the other features described above.

First the internal combustion engine 320 and associated engine cooling system 321 are removed, along with the frame support bars 324, and this results in a battery recess 325 being formed in the excavator 300. In addition, a fuel tank and other components necessary for the operation of an internal combustion engine (not shown) are removed from the excavator 300. Then, a battery support plate 330 is welded or otherwise joined to the frame 323. After installation of the battery support plate 330 the previously described battery 50 or battery 280 in is placed on battery support plate 330. Disposed on the battery 280 is a charger 333 for providing DC current to charge the battery 280. In particular, in the previously described a brace members 112a, 112b contact the battery support plate 330 and are secured to the battery support plate 330 with isolation mounts 114.

In addition, as shown there is the variable frequency motor driver 230 that controls the variable frequency AC induction motor 210, that in, turn rotates and spins a hydraulic pump 328. A metal frame 251 is provided and it supports the variable frequency AC induction motor 210, the hydraulic pump 328, the cooling system 214 and other components that facilitate servicing and cleaning these drive components. In addition, the variable frequency AC induction motor 210 is mounted on the frame 323 with motor isolation mounts 250 and the hydraulic pump 328 are mounted on the frame 323 with motor isolation mounts 250 and this isolates these components from the moving components of the excavator 300 or piece of equipment 298. This has a plurality of advantages, for example the variable frequency AC induction motor 210 and the hydraulic pump 328 are subjected to less stress because they are allowed to move freely and independently relative to the frame 323, and the excavator 300 runs more quietly because vibrations from the variable frequency AC induction motor 210 and the hydraulic pump 328 are transferred to the frame 323 to a much lesser degree. This is because the frame 323 acts as a resonator if the variable frequency AC induction motor 210 and the hydraulic pump 328 are directly mounted thereon. The variable frequency motor driver 230 is attached to the frame with isolation mounts 248 that are independently isolated relative to the variable frequency AC induction motor 210, the hydraulic pump 328, and the frame 323 and this isolates the drive controller 237 from vibrations that could damage the internal components over time.

A pump cooling system 332 cools the hydraulic fluid pumped by the hydraulic ump 328. The variable frequency motor driver 230, hydraulic pump 328 and pump cooling system 332 have been relocated as compared to their location in when employed in connection with a combustion engine. The previously described battery management system 260 is also provided and disposed on the excavator 300. The throttle 270 and visual display 240 are disposed in the cab 334 of the excavator 300.

In addition, as shown in FIGS. 11 and 12 the excavator 300 further includes a battery cover 360 that is removable. There is a motor housing 362 that provides cover to the variable frequency AC induction motor 210 and hydraulic pump 328. A removable access door 364 is mounted in the motor housing 362 that provides for easy access to the above-described components. The access door 364 is also provided with vents 366. The motor housing 362 further includes an outlet panel 368 on which is mounted the AC outlet 315 and a charging port 370, and a charging light indicator 372 that emits light when the battery 280 is being charged. Also shown is a charging cord 374 that can be plugged into a power source to supply power to the charger 333 that serves to charge the battery 280.

In addition, the variable frequency AC induction motor 210 is connected to the hydraulic pump 322, and the variable frequency AC induction motor 210 turns the hydraulic pump 322 to pressurize a hydraulic system 326 of the excavator 300. The variable frequency AC induction motor is connected to the battery 280 by way of the variable frequency motor driver 230. Previously the engine 320, typically a diesel engine, turned the hydraulic pump 322.

It is pointed out that the used excavator already has a counterweight. The weight of the battery 280 also serves as a counterweight.

In another preferred embodiment the piece of equipment 298 or excavator 300 is newly manufactured and constructed to have the machine rechargeable battery power system 200 and features described immediately above, in which case there is no need to modify the excavator 300.

Thus, the present machine rechargeable battery power system 200 provides for a method of rebuilding excavators 300 comprising the acts of:

providing an excavator 300 powered by an internal combustion engine 302;

extracting the engine from the excavator 300;

modifying the frame 310 of the excavator 300 such that it is capable of supporting a support plate 320 and fitting a support plate 320 on the frame 310 for supporting the battery 280;

providing a battery 280 and fixedly supporting the battery 280 on the support plate 320;

installing a variable frequency motor driver 230 and the variable frequency AC induction motor 210 such that they are supported on the support structure 332 affixed on the frame 310;

providing the hydraulic pump 328 and a pump cooling system 330 for cooling the hydraulic fluid pumped by the hydraulic pump 328, which are relocated from their placement in the internal combustion engine 302; and, providing the battery management system 260 and disposing the battery management system 260, the throttle 270 and the visual display 240 in the cab 334 of the excavator 300.

Figure 14:
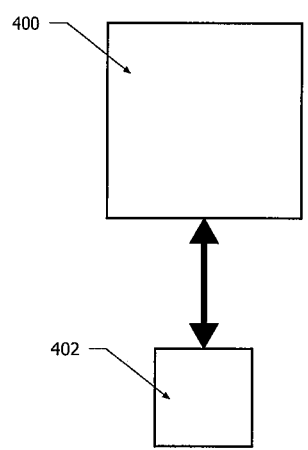
FIG. 14 is a block diagram depicting a service provider entity and customer relationship.

The above-described method of rebuilding a piece of used equipment 298, for example excavators 300 that have been used, provides for a method of generating income. For example and as shown in FIG. 14, there is a service provider entity 400 such as a service store, rebuild company, or a manufacturer that is capable of replacing internal combustion engines 302 with the battery 50, 280 and other power system components. A customer entity or business commonly designated 402 provides a piece of equipment 298 that has been used to the service provider entity 400, or the service provider entity 400 purchases a piece of equipment 298 that has been used, and the service provider entity 400 replaces the internal combustion engine 302 with a the battery 50, 280 and other system components as described above. The service provider entity 400 then charges a fee to the customer entity 402 for labor and cost of the battery 50, 280 and system, or the service provider entity 400 re-sells the piece of equipment 298 to generate income. In other preferred embodiments, the service provider entity 400 makes pieces of equipment 298 that are new with the battery 50, 280 and system components built into the piece of equipment 298 and sells the piece of equipment 280 and to generate a profit.

It is pointed out that the machine rechargeable battery power system 200 and the rechargeable battery power system 10 are not limited to just excavators 300, but they may be used in virtually all construction equipment 298, for example, new and used paving machines, rollers, graders, paving machines, loaders, tractors and trucks and other machines that require a power source. Thus, virtually any piece of equipment 298 having an internal combustion engine 302, for example a gas or diesel engine, and having the engine cooling system 304, and a hydraulic pump 301 may be modified to accept the machine rechargeable battery power system 200 and be equipped with the machine rechargeable battery power system 200. First, the internal combustion engine 302 and associated engine cooling system 304 are removed, and that results in a battery recess 309 being defined in the piece of equipment 298. Then the support plate 320 is welded or otherwise joined to the frame 310 of the piece of equipment. Next, a battery 280 is moved into the battery recess 309 and mounted to the frame 310 of the piece of equipment 298. After installation of the battery support plate 320 the battery 50 or battery 280 is placed on battery support plate 320 that is supported on the pair of brace members 112a, 112b.

Light Tower

Figure 13:
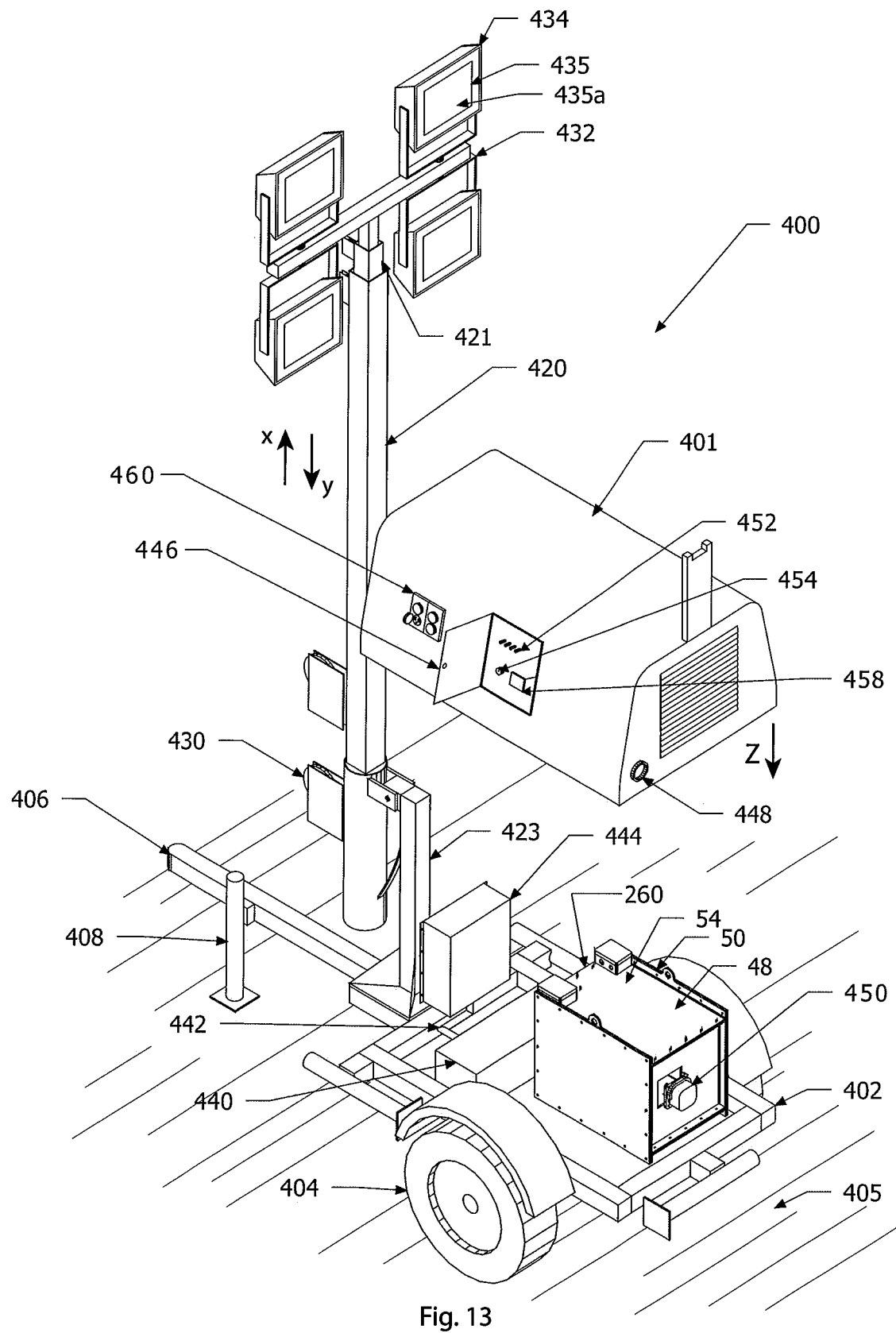
FIG. 13 is a perspective view of another preferred embodiment wherein a light tower is provided having a rechargeable battery power system.

FIG. 13 shows another preferred embodiment wherein there is a light tower 400 having a light tower housing 401 wherein a light tower housing 401 is shown prior to installation on a tower frame 402, with arrow Z designating the direction the light tower housing 401 is to be moved. The tower frame 402 is mounted on wheels 404 and a tongue 406 extends from the tower frame 402. A retractable tongue support 408 extends from the tongue 406 and supports the tower frame 402 on the ground 405 when in an extended position as shown. The tongue 406 is for towing the light tower 400 after the retractable tongue support 408 is moved into a retracted position.

There is also a light tower 420 that is supported on the frame 402, and the light tower 420 is telescopic and has a base portion 423 that houses an extendable portion 421 that can be raised and lowed in the directions of arrows X and Y, respectively. The extendable portion 421 can be manually raised and lowered with, for example, a hand crank 430. The raising and lowering light towers in well-known to those having ordinary skill in the art and therefore is not described in greater detail herein. The extendable portion 421 supports a light array 432 that includes four light fixtures 434 with light bulbs 435. In one of the preferred embodiments the lights bulbs 435 are embodied as LED's 435a and in other embodiments the may be incandescent light bulbs.

Supported on and joined to the tower frame 402 is a battery assembly 48 and in particular the battery housing 54 that holds the battery 50. A service disconnect 450 extends from the battery 50 and incapacitates the battery 50 for storage or maintenance. Lead lines extend from the battery 50 to a tower inverter 440 that converts DC power from the battery 50 to AC power. Inverter lead lines 442 extend from the tower inverter 440 to the light bulbs 435. There is also a method of increasing voltage while reducing current flow to the LEDs 435a by way of DC/AC tower inverter 440 along with an AC/DC inverter located within each of the four light fixtures 434. This arrangement reduces resistive power losses and allows for smaller gauge, lighter and less expensive wire to be used.

The light tower housing 401 also supports a control panel door 446, and supports a charging port 448 so that the battery 50 may be charged from virtually any power source via a light tower charger 444. The control panel door 446 allows access to light switches 452 to control the light array 432, a timer switch 454, a visual display 458 that displays battery information, for example the percent of charge remaining in the battery 50, and a low battery warning light. The timer switch 454 automatically shuts of the systems after a predetermined amount of time passes to eliminate the possibility of the battery 50 being over-discharged. The timer switch 454 also serves as the main power switch, such that in order to turn the light tower 420 on the user must set the time switch 454 in advance. The light tower 420 is silent and this will force the user to set the timer switch 454. In addition, each of the four light fixtures 434 may be turned on or off. Also mounted on the light tower housing 401 are convenience outlets 460 that allow a user to run devices in need of electric power. The convenience outlet 460 is powered by the same DC/AC inverter 440 that powers the LEDs 435a. The battery management system 260 will shut down the DC/AC tower inverter 440 to protect the battery 50 in the event a system fault or low battery condition. In addition, there are limits set on the battery charge and discharge voltage levels that are narrower as compared to maximum and minimum safe levels, and this provides for an added safety margin against overcharge and discharge, significantly longer battery 50 life cycles at the expense of a small reduction in useable capacity, extra capacity at the end of discharge which enables the reserve power feature (described above).

The battery 50 for use with the light tower 420 is designed such that it only has a first module bank 61 and the separator support plate 132 is not present. This is due to the fact that the light tower 420 will not have a need for such a large amount of power in some preferred embodiments.

It is pointed out that the use of the machine rechargeable battery power system 200 and the rechargeable battery power system 10 are provide for power with no pollution at a work, job or activity site, a minimal amount of noise at such sites, and no fuels need at the sites. In addition, because there is no noise and there is no messy odiferous fuels used at the sites the rechargeable battery power system 10 and rechargeable battery power system 200 can be used day or night. Thus, workers can work throughout the night without disturbing the neighborhood or city in which they are working. Additionally, the machine rechargeable battery power system 200 and the rechargeable battery power system 10 can be used indoors, whereas toxic emissions from an internal combustion engine 302 would prohibit it from being used indoors. In addition, the above-described battery 50 can be used by itself to supply electric power.

In addition, the method of assembling the battery 280 may include more than 1000 cells 51 and includes quality control checks at all stages of assembly.

It will be appreciated by those skilled in the art that while the rechargeable battery power system 10 and the machine rechargeable battery power system 200 and methods for providing rechargeable battery systems have been described in connection with particular embodiments and examples, the rechargeable battery power system 10 and the machine rechargeable battery power system 200 methods associated therewith are not necessarily so limited and that other examples, uses, modifications, and departures from the embodiments, examples, and uses may be made without departing from the rechargeable battery power system 10 and the machine rechargeable battery power system 200, and all these embodiments are intended to be within the scope and spirit of the appended claims.

What is claimed is:

1. A rechargeable battery power system comprising:
   a battery assembly having a battery housing and a battery and wherein the battery is disposed in the battery housing;
   the battery has at least one module bank having modules and wherein each module has cells;
   a battery management system and a battery line that connects the battery and the battery management system and a visual display connected to the battery management system;
   a driver controller for controlling a variable frequency motor driver connected to and powered by the battery;
   an AC induction motor with motor drive lines connected to the variable frequency motor driver and the AC induction motor having an output shaft and hydraulic pump driven by the output shaft and wherein driver controller is mounted supported on the piece of equipment with controller isolation mounts and the AC induction motor supported on the piece of equipment with motor isolation mounts;
   a battery management interface for connection to an external power source for charging the battery,
   a piece of equipment having a throttle that is connected to the variable frequency motor driver so that the rate of rotation of the output shaft can be controlled by the throttle and wherein the piece of equipment has a key switch that has an off position and an on position and the battery is disposed in the piece of equipment and when the key is turned from the on position to the off position the sequential shutdown system controls the shutdown process for the piece of equipment; and,
   a sequential shutdown system and a management shutdown line extends from the sequential shutdown system to the battery management system and the sequential shutdown system for controlling the shutdown of the piece of equipment and wherein the analog shutdown line that extends from the sequential shutdown system such that when the key switch is moved to the off position the driver controller cuts off power to the variable frequency AC induction motor first to prevent damage to the driver controller, and wherein the sequential shutdown system commands the driver controller of the variable frequency motor driver to stop powering the variable frequency AC induction motor and then commands the driver controller to shut down after a time delay.

2. The rechargeable battery power system according to claim 1 further including a safety switch that is capable of turning off the variable frequency motor driver and the safety switch is connected to a safety bar that is supported on the piece of equipment and wherein when the safety bar is moved by the operator upon exiting the piece of equipment the safety switch cuts power to the variable frequency AC induction motor for operator safety and to eliminate the possibility of battery drain.

3. The rechargeable battery power system according to claim 1 wherein the variable frequency motor driver includes a power input and an interlock and the power input provides a signal commanding the driver controller to turn on and the interlock input provides a signal commanding the driver controller to allow current to flow to the variable frequency AC induction motor and when the interlock input is turned off current will stop flowing to the variable frequency AC induction motor while the driver controller remains on so that disconnecting the power input will shut down the driver controller.

4. The rechargeable battery power system according to claim 1 wherein the sequential shutdown system further includes power relay and an interlock relay and a time delay circuit and when the key is in an on position inputs to both the power relay and the interlock relay are powered providing direct current power to the power relay and the interlock relay via a key power line that is under the control of the battery management system and when the battery management system allows the battery to discharge a relay control line connected to a 12V ground allows the interlock relay input to be powered such that the battery management system is capable of cutting power to the AC induction motor if there is a battery fault or the battery state of charge of the battery reaches zero.

5. The rechargeable battery power system according to claim 4 wherein the time delay circuit maintains power to the power relay input and the power relay for about one second after the key switch is turned to the off position such that in a shutdown event the interlock relay opens removing power from the interlock input and stopping current flow to the variable frequency AC induction motor from the battery with the power relay opening about one second later shutting down the motor driver controller.

6. The rechargeable battery power system according to claim 1 further including a battery assembly that includes:
   a battery housing having a base wall joined to first and second side walls and the base wall joined to opposed first and second end walls; and having a housing cover that is joined to the first and second opposed side walls and the opposed first and second end walls such that the cover is disposed opposite the base wall;
   the first sidewall includes a metal layer and first and second foam layers and a plastic such that the first foam layer abuts against and is joined with the metal layer, and the first foam layer abuts against and is joined with the second foam layer, and the second foam layer abuts against and is joined with the plastic sheet;
   wherein the second side wall is structurally identical to the first side wall;
   the cover has opposed exterior and interior sides and a service disconnect extends from the exterior side;
   joined to the interior side of the cover is a plastic sheet, and a foam cover sheet is joined to the plastic sheet such that the plastic sheet is disposed between the interior side of the cover and the foam cover sheet;
   wherein the first end wall is joined to a first end wall foam sheet and the second end wall is joined to a second end wall foam sheet, and the second end wall has an exterior end wall surface and a current sensor is mounted to the second end wall;
   the base wall having a base wall sheet having opposed interior and exterior base wall surfaces and wherein joined to the interior base wall surface is a first base wall plastic sheet that is joined to a second base wall rubber sheet; and
   the battery and wherein the battery is disposed in the battery housing.

7. A rechargeable battery power system having a power reserve comprising:

a battery assembly having a battery housing and a battery and wherein the battery is disposed in the battery housing;

the battery has at least one module bank having modules and wherein each module has cells;

a battery management system and a battery line that connects the battery and the battery management system and a visual display connected to the battery management system;

a driver controller for controlling a variable frequency motor driver connected to and powered by the battery;

an AC induction motor with motor drive lines connected to the variable frequency motor driver and the AC induction motor having an output shaft;

a battery management interface for connection to an external power source for charging the battery, a piece of equipment having a throttle that is connected to the variable frequency motor driver so that the rate of rotation of the output shaft can be controlled by the throttle;

a sequential shutdown system and a management shutdown line extends from the sequential shutdown system to the battery management system and the sequential shutdown system for controlling the shutdown of the piece of equipment;

a power reserve system that is connected to and operates with the battery management system such that a source of reserve power is available to the piece of equipment from the battery;

the battery management system initiates the sequential shutdown system to activate when at least one of the following occurs: a battery state-of-charge; or the total voltage of the battery; or the voltage of a cell of the battery reaches a predetermined low limit and wherein the predetermined low limit of voltage is about 3.1 volts;

wherein the piece of equipment has a reserve switch for accessing the power reserve system and further includes a reserve key and wherein the reserve key is optionally not under the control of an operator of the piece of equipment;

a DC/AC inverter in communication with the battery management system and lead lines extend from the DC/AC inverter to an AC outlet disposed on the piece of equipment such that when the reserve switch is turned to an AC position AC power is supplied to an AC outlet disposed on the piece of equipment;

the battery has charge remaining after the battery management system cuts power to the AC induction motor;

the battery has a state of charge with an upper limit of voltage when the battery is fully charged and a normal state of charge lower limit at a percentage of charge above zero charge and the lowest allowable voltage limit of the cell is set to about 2.8V and the normal lower limit voltage of the cell is set to about 3.1V; and, the power reserve system is activated upon turning the reserve switch and the battery management system allows the piece of equipment to continue discharging the battery until the battery reaches the lowest allowable voltage cell voltage limit of about 2.8V.

8. The rechargeable battery power system having a reserve power according to claim 7 further including a battery assembly that includes:

a battery housing having a base wall joined to first and second side walls and the base wall joined to opposed first and second end walls; and having a housing cover that is joined to the first and second opposed side walls and the opposed first and second end walls such that the cover is disposed opposite the base wall;

the first sidewall includes a metal layer and first and second foam layers and a plastic such that the first foam layer abuts against and is joined with the metal layer, and the first foam layer abuts against and is joined with the second foam layer, and the second foam layer abuts against and is joined with the plastic sheet;

wherein the second side wall is structurally identical to the first side wall;

the cover has opposed exterior and interior sides and a service disconnect extends from the exterior side;

joined to the interior side of the cover is a plastic sheet, and a foam cover sheet is joined to the plastic sheet such that the plastic sheet is disposed between the interior side of the cover and the foam cover sheet;

wherein the first end wall is joined to a first end wall foam sheet and the second end wall is joined to a second end wall foam sheet, and the second end wall has an exterior end wall surface and a current sensor is mounted to the second end wall;

the base wall having a base wall sheet having opposed interior and exterior base wall surfaces and wherein joined to the interior base wall surface is a first base wall plastic sheet that is joined to a second base wall rubber sheet; and, the battery and wherein the battery is disposed in the battery housing.

* * * * *